United States Patent [19]
Yamazaki

[11] Patent Number: 6,037,878
[45] Date of Patent: Mar. 14, 2000

[54] PAGING APPARATUS AND PAGING METHOD BY PASSWORD

[75] Inventor: Yasuyuki Yamazaki, Shizuoka, Japan

[73] Assignee: NEC Corporation, Tokyo, Japan

[21] Appl. No.: 08/957,623

[22] Filed: Oct. 24, 1997

[30] Foreign Application Priority Data

Oct. 29, 1996 [JP] Japan ................................ 8-286527

[51] Int. Cl.[7] ................................................. H04Q 7/18
[52] U.S. Cl. ............................ 340/825.44; 340/825.31; 340/825.34; 340/311.1; 455/464
[58] Field of Search ...................... 340/825.44, 825.31, 340/825.34, 311.1; 455/464, 32.1, 410, 411, 415, 527, 528

[56] References Cited

U.S. PATENT DOCUMENTS

| | | | |
|---|---|---|---|
| 4,766,434 | 8/1988 | Matai et al. | 340/825.44 |
| 5,373,289 | 12/1994 | Ichinohe | 340/825.31 |
| 5,436,621 | 7/1995 | Macko et al. | 340/825.34 |
| 5,473,667 | 12/1995 | Neustein | 340/825.44 |
| 5,654,697 | 8/1997 | Uchida | 340/825.34 |
| 5,797,098 | 8/1998 | Schroeder et al. | 455/464 |
| 5,798,708 | 8/1998 | Katayama | 340/825.44 |

FOREIGN PATENT DOCUMENTS

| | | |
|---|---|---|
| 4-175019 | 6/1992 | Japan . |
| 6-152499 | 5/1994 | Japan . |
| 7-298330 | 11/1995 | Japan . |

OTHER PUBLICATIONS

Motorola, Flex, Bravo LX and Bravo FLX Numeric Pagers, May 29, 1996.

Japanese Office Action, dated Dec. 22, with English language translation of Japanese Examiner's comments.

Primary Examiner—Brian Zimmerman
Assistant Examiner—Yves Dalencourt
Attorney, Agent, or Firm—Whitham, Curtis & Whitham

[57] ABSTRACT

The radio paging receiver is a radio paging receiver which can limit, even if a call of a message which does not coincide with a password is received, the call irrespective of whether the calling password is forgotten. The radio paging receiver has a telephone directory function by which data of a name, an address, a telephone number and so forth of an individual can be stored, and uses each of telephone numbers of the telephone directory data as a calling password. When a received message includes numeric data of four or more digits, a receiver carrying person retrieves the lowest four digits of the numeric data from telephone numbers of the telephone directory data by a controller 4-1, 4-2 and 4-3 of a paging apparatus by a password, and only when a coincident telephone number is detected, a calling operation by speaker alert sound is performed. A person who tries to send a message can, since the password of the radio paging receiver of the receiver carrying person is the telephone number of the person itself, call the radio paging receiver irrespective of whether or not the person forgets the calling password.

10 Claims, 11 Drawing Sheets

TELセヨ１２３４

PAGING APPARATUS AND PAGING METHOD BY PASSWORD

BACKGROUND OF THE INVENTION

1. Field of the Invention

This invention relates to a paging apparatus and a paging method by a password, and more particularly to a paging apparatus and a paging method by a pass word by which a calling operation of a received message is controlled using a telephone number of telephone directory data as a password.

2. Description of the Related Art

Conventionally, paging apparatus by a password include a radio paging receiver which performs paging by a password. For example, as disclosed in Japanese Patent Laid-Open Application No. Heisei 6-152499 or Japanese Patent Laid-Open Application No. Heisei 4-175019, a user stores a password into a radio paging receiver in advance, and when a message is received after stand by receiving of paging by a password is set, comparison between a character train included in the received message and the password stored in the radio paging receiver is performed, and the calling operation is limited when they do not coincide with each other.

In the following, the conventional radio paging receiver disclosed in Japanese Patent Laid-Open Application No. Heisei 6-152499 is described with reference to the drawings.

FIG. 1 is a block diagram of the conventional radio paging receiver, and FIG. 2 is a flow chart illustrating an operation procedure of notification of reception of a password of the radio paging receiver.

Referring to FIG. 1, the radio paging receiver includes radio unit 102 for demodulating a radio signal received by antenna 101, ID-ROM 104 in which a paging number of the self receiver is stored in advance, paging number comparator (ID discriminator) 105 for comparing a paging number included in the received radio signal with the paging number of the self receiver stored in advance in ID-ROM 104, password memory 106 in which a password is stored in advance, password comparator 107 for comparing a password in the received message with the password of the self receiver, set time memory 108 for storing a limit time for reception, clock unit 112 for generating a real time signal, message memory 111 for storing the received message, notification unit (speaker & indicator) 109 for generating and notifying a call signal, display unit (LCD display) 110 for displaying the received message, and controller 103 for controlling the entire radio paging receiver.

Next, operation of the radio paging receiver is described with reference to FIGS. 1 and 2.

Referring to FIG. 1, a radio signal is demodulated by radio unit 102. The demodulated data is sent to controller 103, and a paging number included in the received data is compared with the paging number of the self receiver stored in ID-ROM 104 by paging number comparator 105. If they coincide with each other, then comparison between a character train included in the received message and the password stored in password memory 106 is performed by password comparator 107. If the comparison with the password proves coincidence, then the call is notified by notification unit 109. Display unit 110 displays the received message simultaneously with the notification. However, if coincidence is not detected, then it is discriminated whether or not notification is limited at present, and only when notification is not limited, the call is notified. Whether or not notification is limited is discriminated by comparison of the present time counted by clock unit 112 with a limit start time and a limit cancellation time set in advance in set time memory 108 by controller 103. Further, when the notification limit is effective at present and no notification should be performed, the received message is stored once into the message memory 111 and then the call is notified when the notification limit is canceled.

Controller 103 of the radio paging receiver performs operation illustrated in FIG. 2 when a message is stored.

Referring to FIG. 2, controller 103 discriminates whether or not a password exists in the received message (S101), and if a password exists, then the call and the message are notified (S102). If no password exists, then controller 103 discriminates whether or not it is within the limit time (S103), and if it is not within the limit time, then the call and the message are notified (S104). If it is within the limit time, then the call and the message are not notified (S105). In this instance, controller 103 stores the received message (S106), and then notifies the call and the message after the notification limit is canceled (S107).

As described above, the radio paging receiver includes notification limiting means for notifying a received message only when a particular password set in advance is included in the received message, time setting means for enabling the notification limit means at a first time set in advance and disabling the notification limit means at a second time set in advance, and notifying means for notifying a message, which has been subject to limit to notification while the notification limit means is enabled, at the second time, and consequently, it can limit an originating person depending upon the time and allows a carrying person to use it further conveniently.

However, in a paging apparatus by a password till now, where a paging unit by a password of the conventional radio paging receiver is used, if a person who tries to send a message forgets the password, then even if a radio paging receiver of a receiver carrying person is in a set state to stand by receiving of the paging unit by a password, the message is not conveyed to the other party. The paging apparatus has a problem in that a person who tries to send a message must remember a password of a radio paging receiver of a receiver carrying person without fail.

Further, in a paging apparatus of the type described, if a message received while stand by receiving of the paging unit by a password is set includes a character train which does not coincide with a password stored in the radio paging receiver, the message is either notified after the setting of paging by a password is released or neglected at all.

In this instance, if the message is notified after release of the setting of stand by receiving of the paging unit by a password, then even if a receiver carrying person sets the paging unit by a password to stand by receiving, if someone knows a paging telephone number of the radio paging receiver of the receiver carrying person, then it may sent such a message out of spite that may cause the receiver carrying person to feel disagreeable, or a message may be sent from a person having no relation because of dialing of the paging telephone number in error. Further, also telephone numbers around the paging telephone number of the radio paging receiver in most cases are paging numbers of other radio paging receivers.

For example, if a telephone number *-*-1234 is the paging telephone number of a radio paging receiver, where also 1233 or 1235 is a paging telephone number of another radio paging receiver, even if a third party sends a mischievous message, all messages are notified at a point of time when stand by receiving of the paging unit by a password is released, and a call of such a message that embarrasses the receiver carrying person cannot be prevented.

On the other hand, a paging apparatus of the type described above has a problem in that, if a message which does not coincide with a password is neglected at all, then even if a person who does not known the password sends an important message, the message is not conveyed to the receiver carrying person.

SUMMARY OF THE INVENTION

It is an object of the present invention to provide a paging apparatus and a paging method by a password which makes it difficult for a person who tries to send a message to forget a password of a radio paging receiver and allows selection of how to process a message call which does not coincide with the password after paging by a password is set to stand by receiving.

A paging apparatus and a paging method by a password of the present invention have a telephone directory function by which data of a name, an address, a telephone number and so forth of an individual can be stored, and after a receiver carrying person sets paging by a password to stand by receiving, when a received message includes numeric data of four or more digits, the lowest four digits of the numeric data are retrieved from telephone numbers of the telephone directory data, and then, only when a coincident telephone number is detected, a calling operation by speaker alert sound is performed.

The paging apparatus and the paging method by a password of the present invention have a telephone directory function by which data of a name, an address, a telephone number and so forth of an individual can be stored, and use each of telephone numbers of telephone directory data as a calling password. After a receiver carrying person sets paging by a password to stand by receiving, when a received message includes numeric data of four or more digits, the lowest four digits of the numeric data are retrieved from telephone numbers of the telephone directory data, and then, only when a coincident telephone number is detected, a calling operation by speaker alert sound is performed.

With the paging apparatus and the paging method by a password of the present invention, since each telephone number in the telephone directory data is used as a password for paging, a person who tries to send a message does not forget the password readily because the password of the radio paging receiver of a receiver carrying person is the telephone number of the person itself. Further, when a message having an incoincident password is received in a stand by receiving state of paging by a password, the receiver carrying person can select whether or not the received message should be left in a memory for the convenience of the receiver carrying person itself without operating a message unnecessary for the receiver carrying person.

BRIEF DESCRIPTION OF THE DRAWINGS

FIG. 12 is a view illustrating a display example of a liquid crystal display unit showing another embodiment of the present invention.

DESCRIPTION OF THE PREFERRED EMBODIMENT

Figure 1:
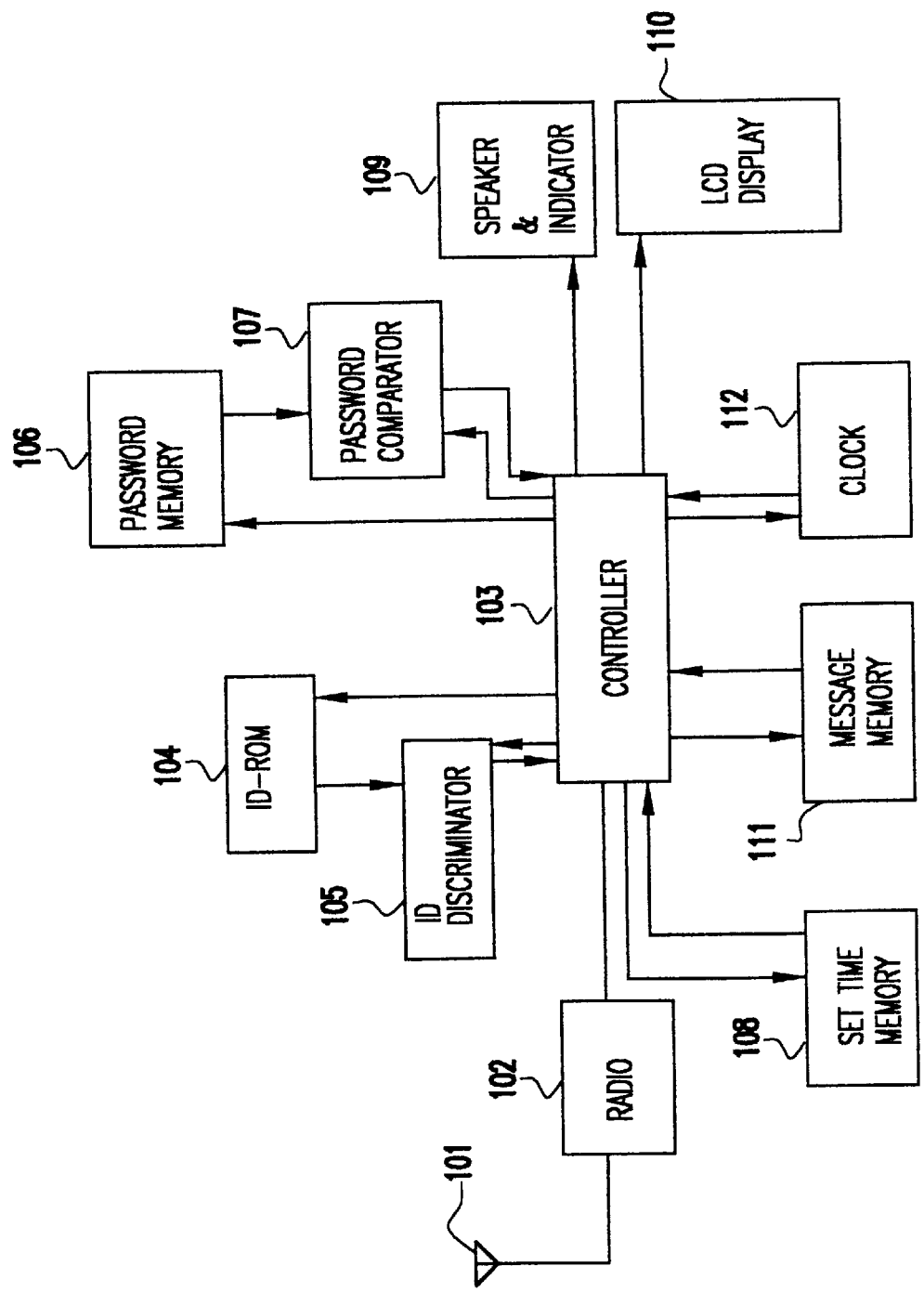
FIG. 1 is a block diagram illustrating a construction of a radio paging receiver of the prior art.
Figure 2:
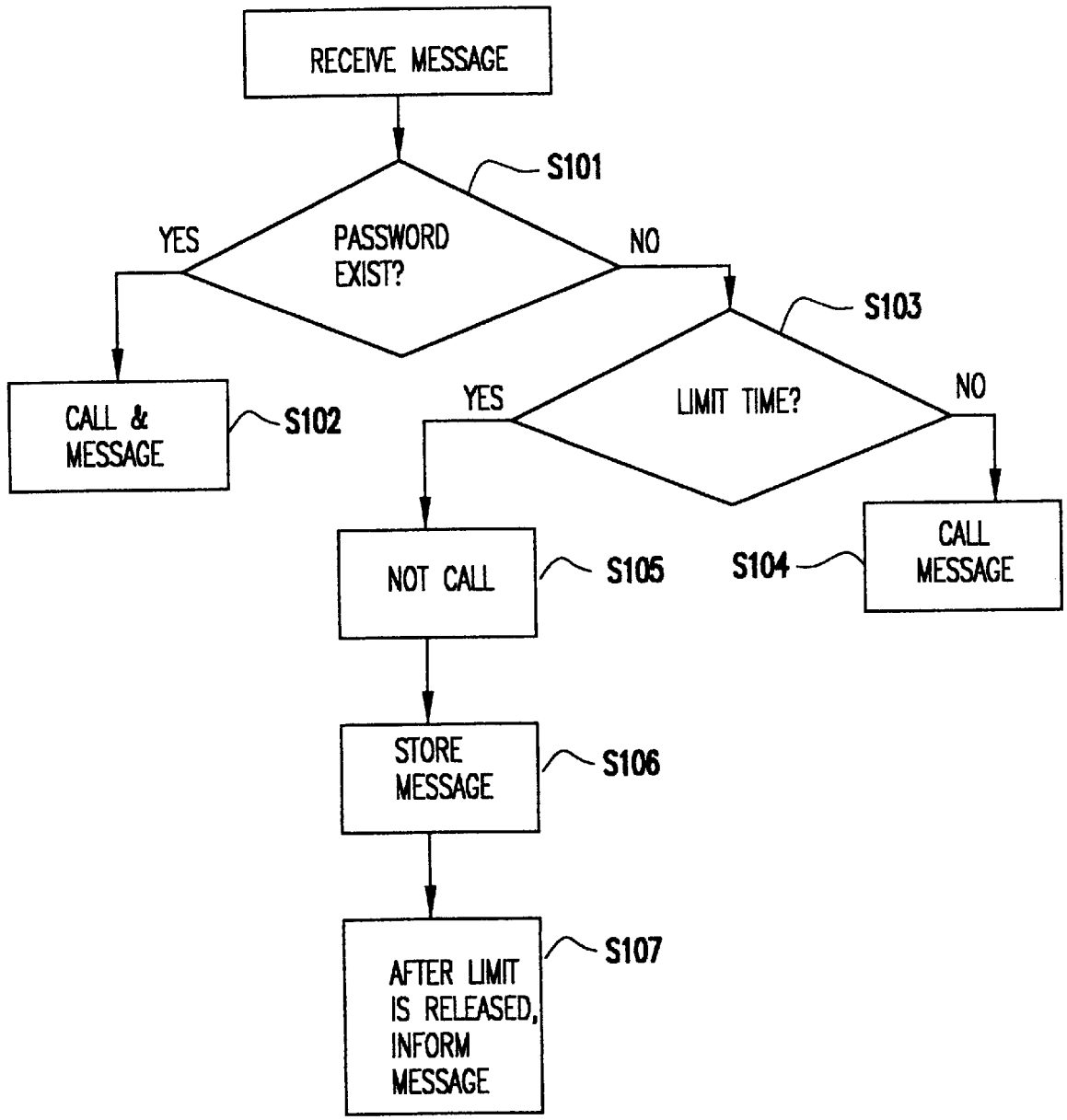
FIG. 2 is a flow chart illustrating operation of the radio paging receiver of the prior art.
Figure 3:
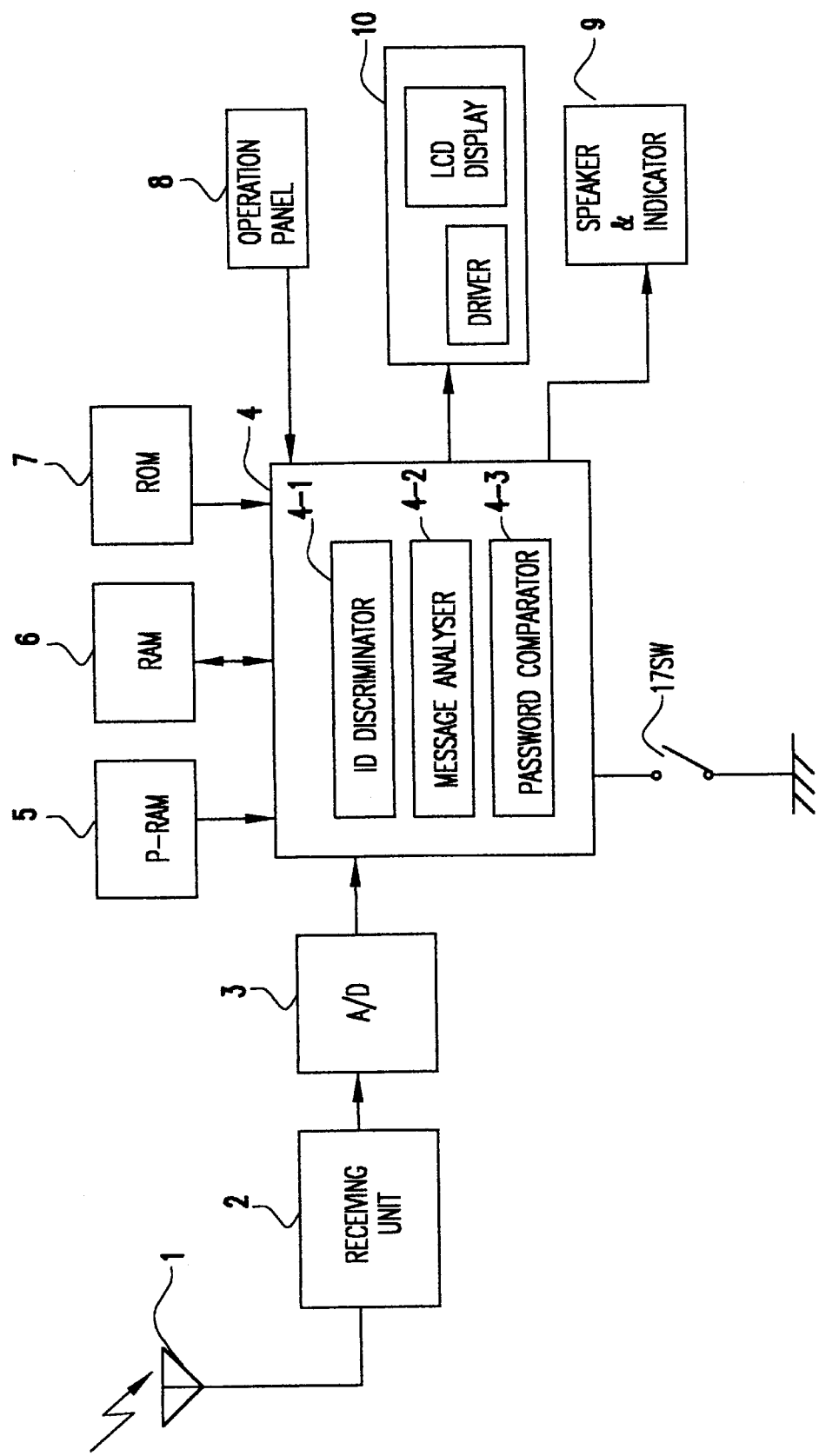
FIG. 3 is a block diagram illustrating a construction of an embodiment of the present invention.
Figure 4A:
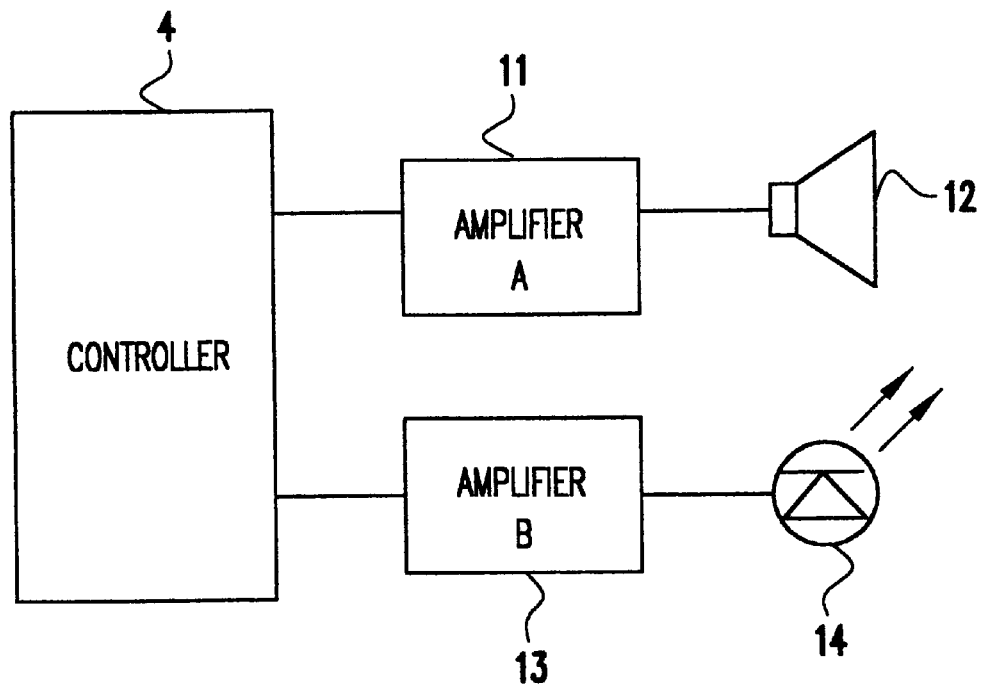
FIGS. 4A and 4B are partial views of FIG. 3, and FIG. 4(*a*) is a view showing a construction of a notification unit and FIG. 4(*b*) is a view showing a construction of a switch unit.
Figure 4B:
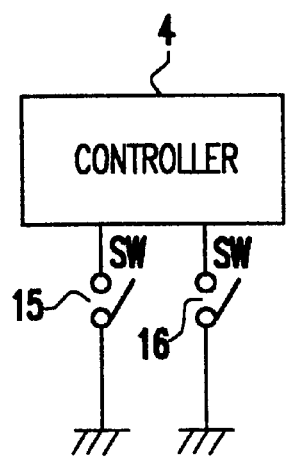
Figure 5:
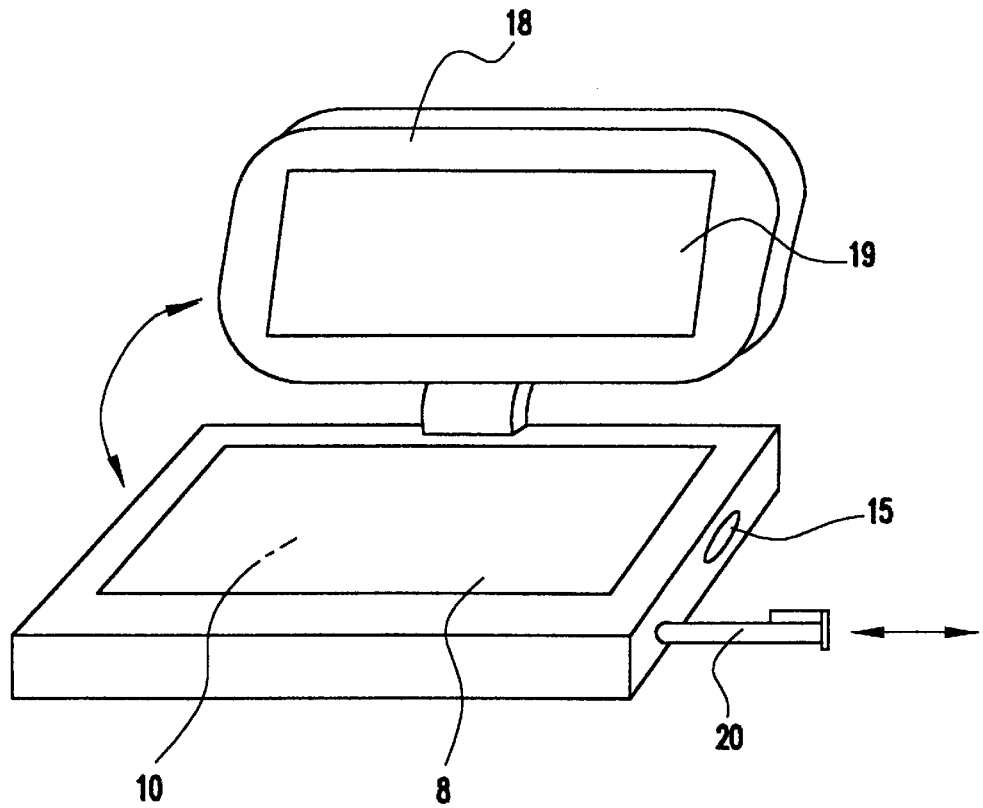
FIG. 5 is a perspective view showing an appearance shape of a radio paging receiver of the embodiment of the present invention.

FIG. 3 is a block diagram illustrating a construction of an embodiment of a paging apparatus and a paging method by a password of the present invention. FIG. 4 is partial views of FIG. 3, and FIG. 4A is a view showing a construction of a notification unit and FIG. 4B is a view showing a construction of a switch unit. FIG. 5 is a perspective view showing an appearance shape of the radio paging receiver of FIG. 3.

Referring to FIG. 3, the radio paging receiver of the present embodiment includes a receiving unit 2 for receiving a radio signal from a radio base station not shown through an antenna 1, a waveform shaping (A/D) circuit 3 for converting the signal amplified and demodulated by the receiving unit 2 into a digital signal, a controller 4 for controlling all components of the radio paging receiver, a programmable read access memory (P-RAM) 5 in which a paging number of the self receiver is stored in advance, a random access memory (RAM) 6 for storing message data analyzed by the controller 4 and telephone directory data, scheduler data and so forth, a read only memory (ROM) 7 in which detailed function data and so forth are stored in advance, an operation panel 8 for allowing a user to input required data of a telephone directory, a scheduler and so forth, a liquid crystal display (LCD) unit 10 including a driver for outputting a display signal, a notification unit (speaker and indicator) 9 for sounding a call signal outputted from the controller 4 by means of a speaker and lighting an LED, and a switch element 17.

The controller 4 includes an ID discriminator 4-1 for comparing a data signal outputted from the waveform shaping circuit 3 with the paging number of the self receiver written in advance in the P-RAM 5, a message analyzer 4-2 for similarly analyzing a message from the data signal outputted from the waveform shaping circuit 3, and a password comparator 4-3 for comparing a password included in the received message with the password stored in advance in the controller 4.

The notification unit 9 includes, as shown in FIG. 4A, an amplifier A 11 for amplifying a speaker alert signal outputted from the controller 4, a speaker 12 for outputting the speaker alert signal from the amplifier A 11 by voice, another amplifier B 13 for amplifying an LED alert signal outputted from the controller 4, and an LED 14 for emitting light of the LED alert signal from the amplifier B 13.

The switch element 17 includes, as shown in FIG. 4B, a multi-function switch 15 for setting a power supply of a paging part and stand by receiving of paging, and a power supply switch 16 for an electronic notebook part such as a telephone directory and a scheduler.

Meanwhile, the radio paging receiver shown in FIG. 5 includes a pen 20 accommodated on a side face of a body for operating the operation panel 8, a lid 18 mounted for opening and closing movement with respect to the body by means of a hinge for protecting the operation panel from a damage or an impact, a transparent window 19 provided at a position corresponding to a display part of the liquid crystal display unit when the lid 18 is closed, and the multi-function switch 15 provided at a position at which it can be pushed down even when the lid 18 is closed.

In the radio paging receiver shown in FIG. 5, basic operations of the radio paging receiver can be performed while the lid 18 is in a closed condition because it has such a structure that, while the lid 18 is in a closed condition, contents displayed on the LCD unit 10 can be visually observed through the transparent window 19 and the power supply to the radio unit and the multi-function switch 15 operable for confirmation of a received message and also for setting paging to stand by receiving.

In the present embodiment, if a user continuously pushes down the setting switch 15, then the power supply of the radio paging receiver is turned on and the radio paging receiver enters a stand by receiving state, and if a message of the call number of the self receiver is received in this state, then a call operation wherein light of the LED 14 and speaker alert sound from the speaker 12 are outputted and the received message is displayed on the LCD unit 10 simultaneously is performed.

During the call operation, if the user pushes down the setting switch 15, then the call operation by the speaker 12 and the LED 14 is stopped, but the received message displayed on the LCD unit 10 continues to be displayed as it is. While the display of the received message continues within a time set in advance, it can be turned off also if the setting switch 15 is pushed down during the display.

Further, if the multi-function switch 15 is pushed down when the display of the LCD unit 10 is off, then one of received messages stored in the RAM 6 which has been received latest is displayed on the LCD unit 10. Thereafter, each time the switch 15 is pushed down during the display of the received message, if other messages received prior to the message being displayed at present exist, then the messages are displayed in the order reverse to that in which they have been received. Such retroactive display is repeated until the oldest message stored in the RAM 6 is displayed.

Further, the radio paging receiver of the present embodiment includes a data managing unit including telephone directory data and scheduler data, and operation procedure data of the data managing unit are displayed on the operation panel 8 on the LCD unit 10 under the control of the controller 4. If the operation panel 8 on the LCD unit 10 is touched with the pen 20 in accordance with the displayed operation procedure, the controller 4 recognizes at which position the operation panel 8 is operated and performs a function operation instructed by the user.

Next, the embodiment of the present invention is described in more detail with reference to the drawings. FIG. 3 is a block diagram of the embodiment of the radio paging receiver of the present invention.

Referring to FIG. 3, a radio signal from a radio base station not shown is received by antenna 1 and amplified and demodulated by receiving unit 2. The demodulated signal is converted by waveform shaping circuit 3 into a digital signal which can be read by controller 4. Controller 4 compares, by ID discriminator 4-1 therein, the signal outputted from the waveform shaping circuit 3 and the paging number of the self receiver written in advance in programmable read access memory (P-RAM) 5 with each other. If they coincide with each other, then in order to notify to the user that a call has been received, controller 4 outputs alert signals to amplifier A 11 and amplifier B 13.

Further, a message signal following the call number of the self receiver is analyzed by message analyzer 4-2 and displayed as a received message on LCD unit 10. The speaker alert signal outputted from controller 4 is amplified by amplifier A 11 and drives speaker 12. Speaker 12 converts the driving signal into an acoustic signal and sounds it as alert sound to notify to the user that a call has been received. Meanwhile, amplifier B 13 amplifies the LED alert signal outputted from controller 4 and causes LED 14 to emit light to notify the user that a call has been received.

Multi-function switch 15 serves as a power supply switch for the radio unit of the present apparatus and also as a setting switch for stand by receiving of paging. Power supply switch 16 is a power supply switch having a managing function for the telephone directory and the scheduler and an electronic notebook function. By providing multi-function switch 15 and power supply switch 16 independently of each other, even if the electronic notebook function is inoperative, the radio paging receiver can operate as a function of a radio paging receiver.

Further, controller 4 of the radio paging receiver of the present invention displays an operation procedure on LCD unit 10, recognizes, when the display part of LCD unit 10 is touched on the operation panel 8 placed on LCD unit 10, at which position operation panel 8 is operated by the user, and performs operations of the operation procedure. Controller 4 can store telephone directory data of the electronic notebook function inputted from operation panel 8, received message data and other necessary data into RAM 6 and display the data on LCD unit 10 in response to an operation of operation panel 8 again.

On the other hand, dictionary function data ('kanji' and so forth) written in advance are stored in ROM 7, and if a user inputs kana characters by an operation of operation panel 8, then controller 4 reads in 'kanji' data converted with the dictionary function data of ROM 7 and displays a table of the characters obtained by the conversion on LCD unit 10 so that the user can select a desired character from among the display contents to input the data.

Figure 6:
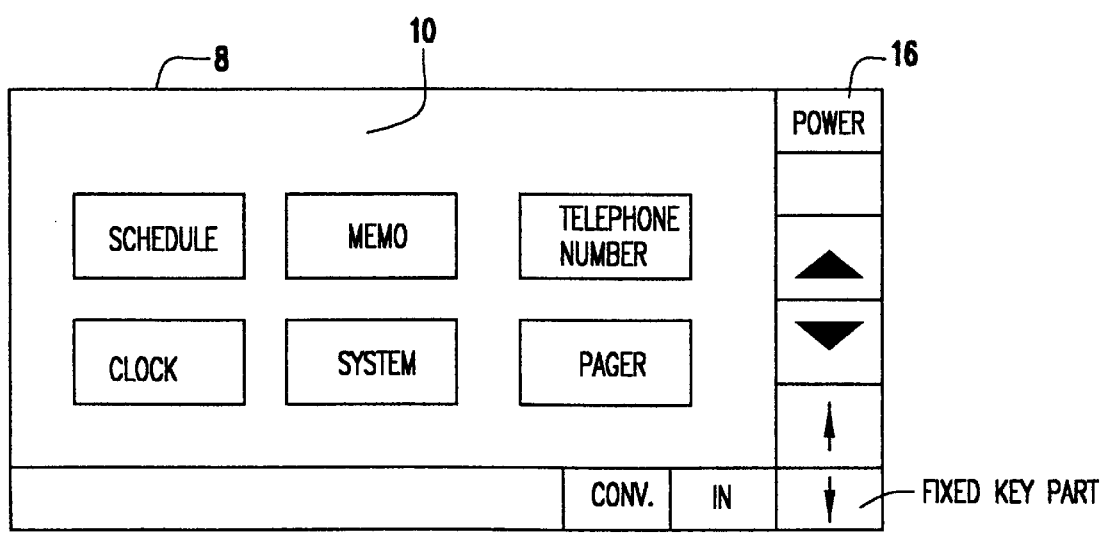
FIG. 6 is a view showing a display example of an operation panel.
Figure 7:
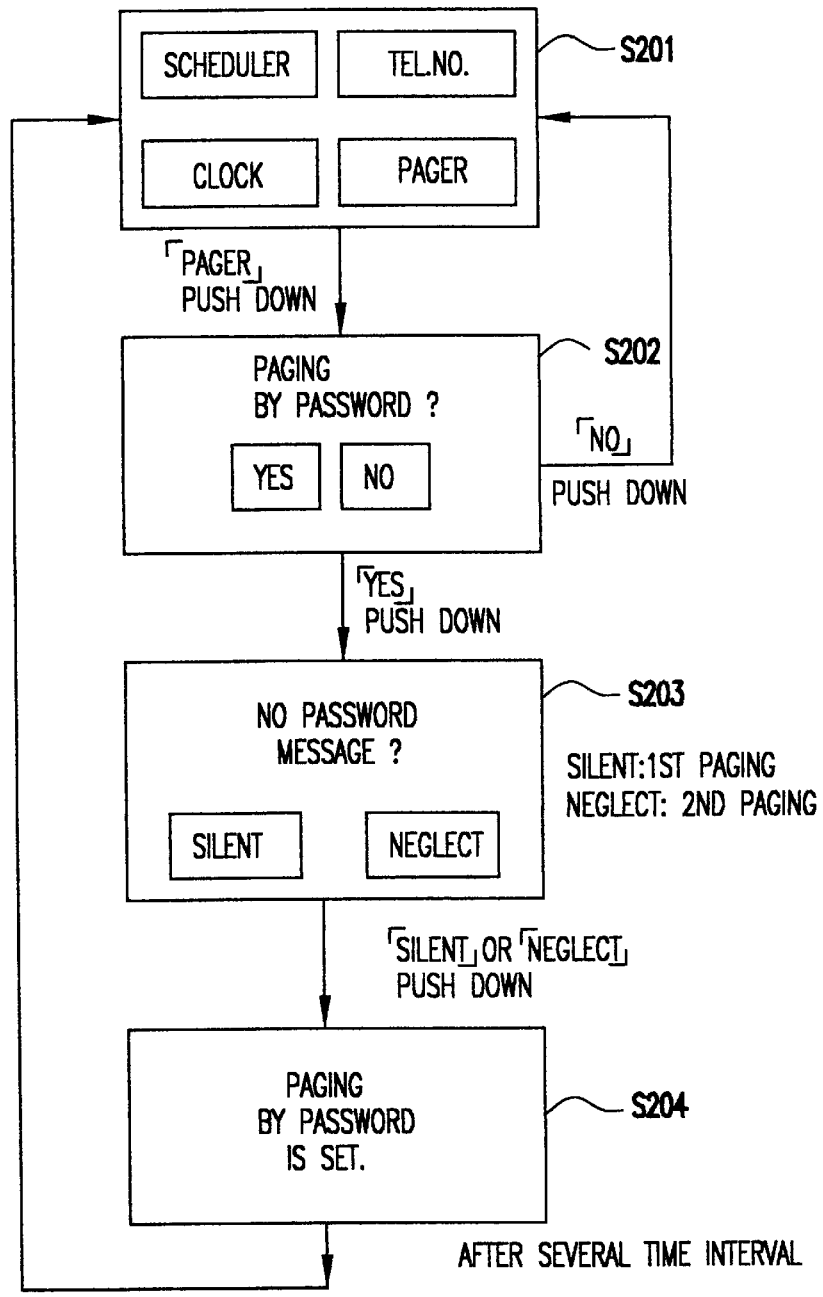
FIG. 7 is a flow chart of setting of paging by a password on the operation panel.
Figure 8:
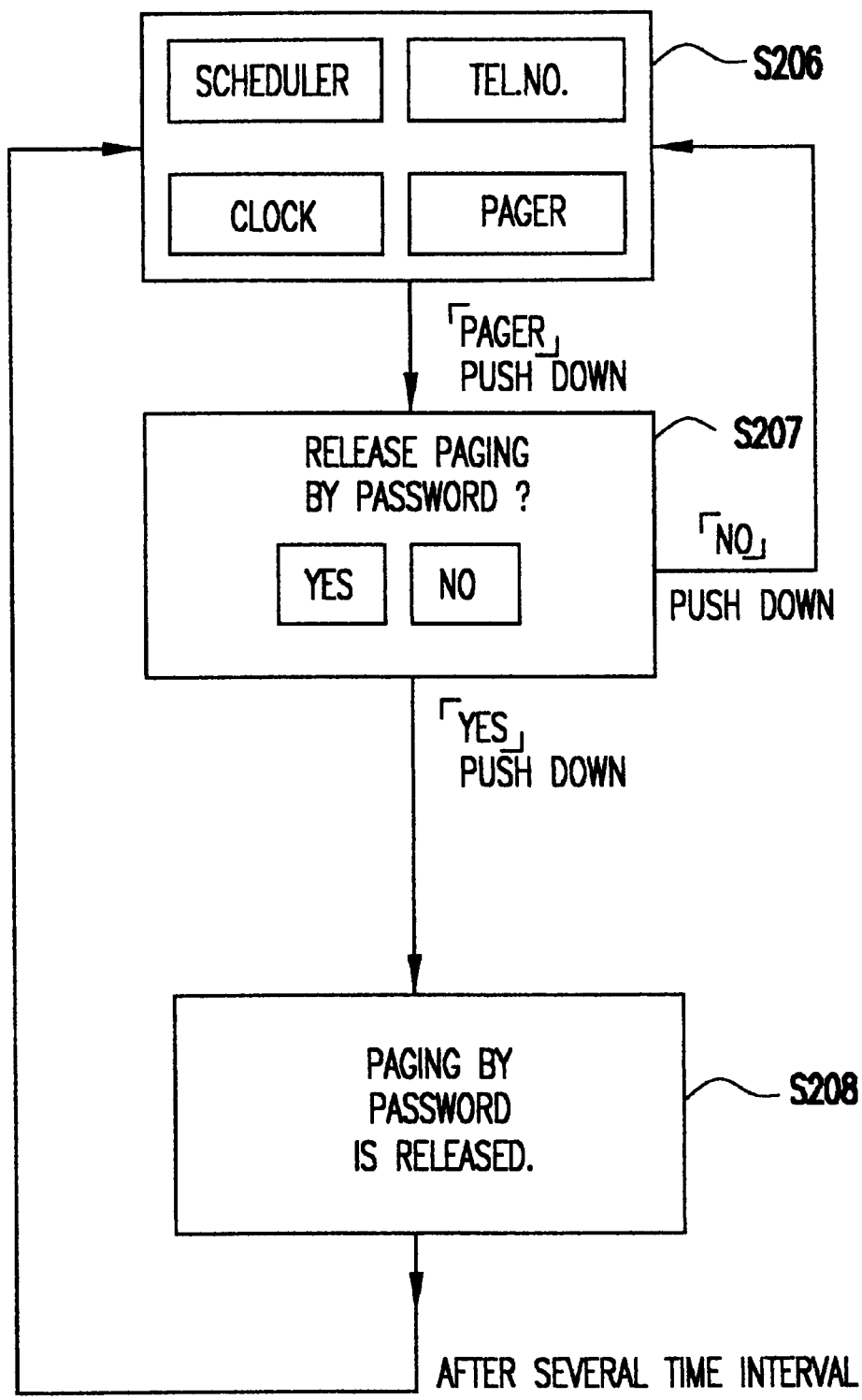
FIG. 8 is a flow chart of cancellation of paging by a password on the operation panel.

Next, a method of setting stand by receiving of paging by a password by an operation from operation panel 8 by a user is described with reference to the drawings. FIG. 6 is a view showing an example of a display of the operation panel. After power supply switch 16 provided on a side edge of LCD unit 10 is turned on, an operation of setting of paging, inputting of a telephone directory, schedule management and so forth can be started by touching operation panel 8 with the pen. FIG. 7 is a flow chart of setting of paging by a password on the operation panel, and FIG. 8 is a flow chart of release of paging by a password on the operation panel.

According to a paging function setting method by a password of the radio paging receiver of the present invention, as illustrated in FIG. 7, if switch (SW) 16 is pushed down after the power supply to the radio paging receiver is turned on by continuous pushing down of switch (SW) 15, then a menu screen of the electronic notebook is displayed on LCD unit 10 as seen in S201. The menu screen has a "password setting" (pager) icon at a part thereof, and if the user depresses the "password setting" displaying part from above operation panel 8, then a question of whether or not paging by a password should be executed to the user is displayed on LCD unit 10 as seen in S202. Thus, if "YES" is pushed down, then a display indicating that a call method for a case wherein numeric data included in the received message does not coincide with the password or no password is added to the received message should be selected is displayed on LCD unit 10 as seen in S203.

If "silent" is selected then, a first paging method wherein a call only by lighting of LED 14 and display of the received message by LCD unit 10 is performed immediately after the message is received and the received message is stored into the memory so that it can be confirmed later is set as indicated in S204.

On the other hand, if "neglect" is selected in S203, then a second paging method wherein, even if a message is received, this is not reported at all and the message is not stored into the memory is set as seen in S204. Then, after it is displayed for a fixed time on LCD unit 10 that paging by a password has been set, the display returns to the menu screen of S201. On the other hand, if the "password setting" (pager) part is pushed down in S201 while the power supply of the radio paging receiver is not on, then a display that no power supply is available is displayed on LCD unit 10 as seen in S205, and after the fixed time, the display returns to the menu screen of S201.

Further, a method of releasing the paging function by a password is illustrated in FIG. 8. If switch 16 is pushed down, then a menu screen for the electronic notebook is displayed on LCD unit 10 as seen in S206. If the "password setting" part is pushed down similarly as upon setting, then a question of whether or not the paging by a password should be released is displayed on LCD unit 10 as seen in S207. Thus, if the "YES" part is depressed, then the paging by a password is released as seen in S208. Thereafter, for all messages received, a normal call operation by display of a received message by LCD unit 10, sounding by speaker 12 and lighting of LED 14 is performed.

On the other hand, when the power supply of the radio paging receiver is on, if switch 15 is continuously pushed down, then the power supply of the radio paging receiver is turned off. Paging by a password is canceled also when, while the paging by a password is set, the power supply of the radio paging receiver is turned on by pushing down of multi-function switch 15 after the radio paging receiver is turned off by continuous pushing down of multi-function switch 15.

Controller 4 limits a call operation for a case wherein a message received after setting of stand by receiving of paging by a password does not coincide with the password or no password is added to the received message, immediately after the reception, to a call only by lighting of LED 14 and display of received message by the LCD unit 10 so that the received message may be confirmed later. To this end, in the present embodiment, in order to cause the user to select whether the first paging method wherein a received message is stored into the memory should be performed or the second paging method wherein, even if a message is received, this is not notified at all and the received message is not stored into the memory thereby to neglect the message completely should be performed, the choices are displayed on LCD unit 10. Thus, the user will perform selection by an operation from operation panel 8, thereby completing the setting of stand by receiving of paging by a password.

Next, operation of the paging function by a password of the radio paging receiver of the present invention is described with reference to FIGS. 9 and 10.

Figure 9:
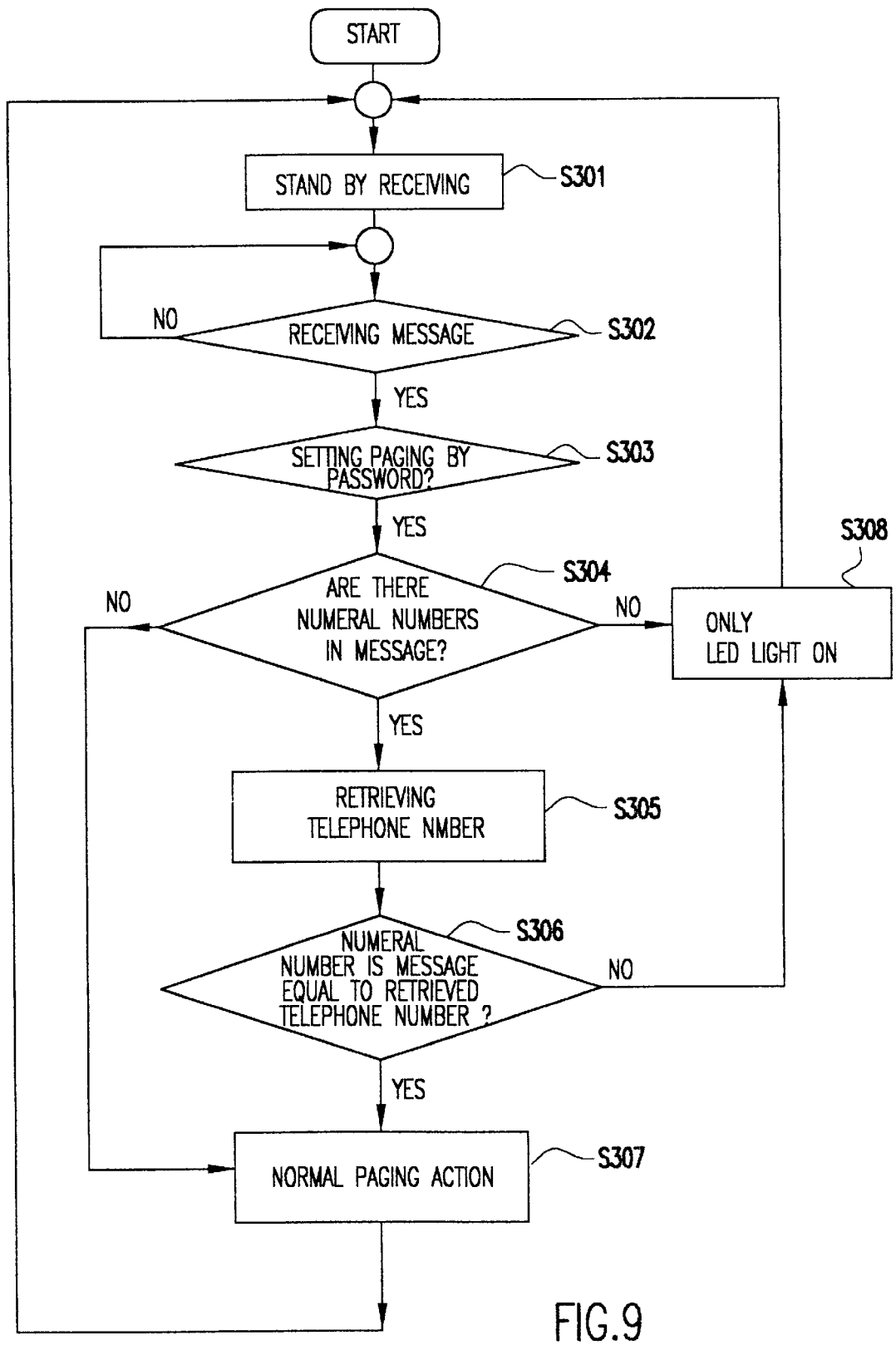
FIG. 9 is a flow chart illustrating operation where a user selects a first call operation control after setting of stand by receiving of paging by a password of the radio paging receiver of the present invention is performed.

FIG. 9 is a flow chart when the first paging method is selected wherein the call operation when a message received after the user in the description of the construction described above sets stand by waiting of paging by a password does not coincide with the password or no password is added to the received message is limited, immediately after the reception, to a call only of lighting of LED 14 and display of the received message by LCD unit 10.

In the present embodiment, if the power supply of the radio paging receiver is turned on by setting switch 15, then a stand by receding state of paging by a password is entered in S301. In this instance, when the user selects the first paging method, Y in S302 is selected and a message of a call signal of the self receiver is received. In this instance, the control advances to step S303, in which controller 4 confirms whether stand by receiving of paging by a password is set. On the contrary, if stand by receiving of paging by a password is not set, N in S303 is selected, and the control jumps to S307, in which a normal paging action wherein the user is notified that a call has been received by alert sound by speaker 12, lighting of LED 14 and display of the received message by LCD unit 10 is performed.

On the other hand, if stand by receiving of paging by a password is set, then Y in S303 is selected, and in this instance, the received message data include numeric data representative of a telephone number like, for example, "Please call me 1234" (the telephone number may include an office number such as *-*-1234). In this instance, in S305, controller 4 retrieves the lowest four digits of the numeric data (in this instance, 1234) from telephone numbers of the telephone directory data stored in RAM 6.

In S306, password comparator 4-3 compares the retrieved telephone numbers with the numeric data of the received message data, and if one of the retrieved telephone numbers exhibits coincidence, then Y in S306 is selected and a call operation for normal reception in S307 is performed similarly as in the case wherein stand by receiving of paging by a password is not set in S307.

Further, it is discriminated that the result of the retrieval in S305 does not include a coincident telephone number as a result of comparison by password comparator 4-3, then N is selected in S306, and the control advances to S308, in which a call operation only by lighting of the LED is performed. Meanwhile, when the received message does not include numerals, the control advances to S308, in which a call operation only by lighting of the LED. In this instance, where the received message includes no numeric data like, for example, "I'll be late", a call by only lighting of LED 14 and display of the received message by LCD unit 10 immediately after reception is performed, and the received message is stored into the memory so that it may be confirmed later.

After completion of the call operation in S307 or S308, the control advances to S301, in which a stand by receiving state is entered again. Thereafter, the sequence of operations described above is repeated until the stand by receiving of the paging by a password is released.

Figure 10:
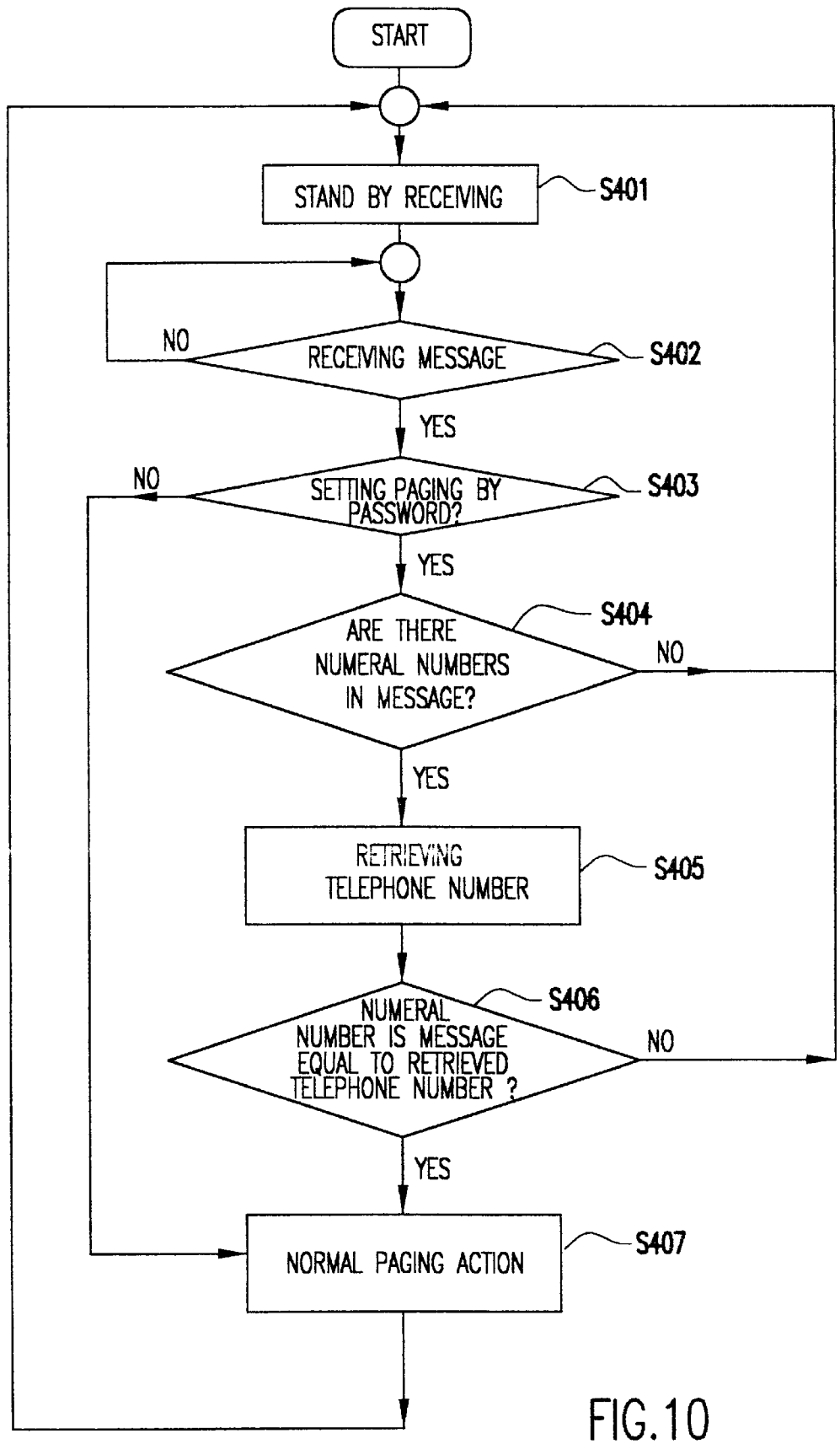
FIG. 10 is a flow chart where a user selects a second call operation control after setting of stand by receiving of paging by a password of the radio paging receiver of the present invention is performed.

FIG. 10 is a flow chart when the second paging method is selected. FIG. 10 is provided for description of a case wherein the call operation when a message received after the user in the description of the construction of FIGS. 3, 4 and 5 sets stand by waiting of paging by a password does not coincide with the password or no password is added to the received message is not notified at all upon reception nor the received message is stored into the memory, thereby neglecting the message completely.

In the present embodiment, if the power supply of the radio paging receiver is turned on by setting switch 15, then the radio paging receiver enters a stand by receiving state of paging by a password in S401. Thereupon, if the user selects the second paging method, then Y of S402 is selected, and when a message of a call number of the self receiver is received, controller 4 advances its control to S403, in which it confirms whether or not stand by receiving of paging by a password is set at present.

If stand by receiving of paging by a password is not set, N of S403 is selected and the control advances to S407, in which an ordinary paging operation wherein the user is notified that a call has been received by alert sound by speaker 12, lighting of LED 14 and display of the received message by LCD unit 10 is performed. After completion of the call operation, a stand by waiting state is entered again in S401.

If stand by receiving of paging by a password is set, then Y of S403 is selected, and in this instance, if the received message data include numeric data representative of a telephone number like, for example, "please call me 1234", then Y of S404 is selected. In this instance, the control advances to S405, in which controller 4 retrieves the lowest four digits of the numeric data (in this instance, 1234) from among the telephone numbers of the telephone directory data stored in RAM 6.

When comparison of the retrieved telephone numbers is performed by password comparator 4-3, if a coincident telephone number is detected, then Y of S406 is selected and the control advances to S407, in which a normal paging action is performed similarly as in the case wherein stand by receiving of paging by a password is not set in S403.

Furthermore, when comparison is performed for the result of the retrieval by password comparator 4-3 and N of S406 is selected because the result of the comparison by password comparator 4-3 does not reveal a coincident telephone number or when N of S404 is selected because the received message does not include numeric data like, for example, "I'll be late", no paging operation is performed and a stand by receiving condition is entered again in S401. Thereafter, the sequence of operations is repeated until the stand by receiving of paging by a password is released.

In the following, an operation of entering the telephone directory to be used for paging by a password into the second memory is described with reference to the drawings.

Figure 11:
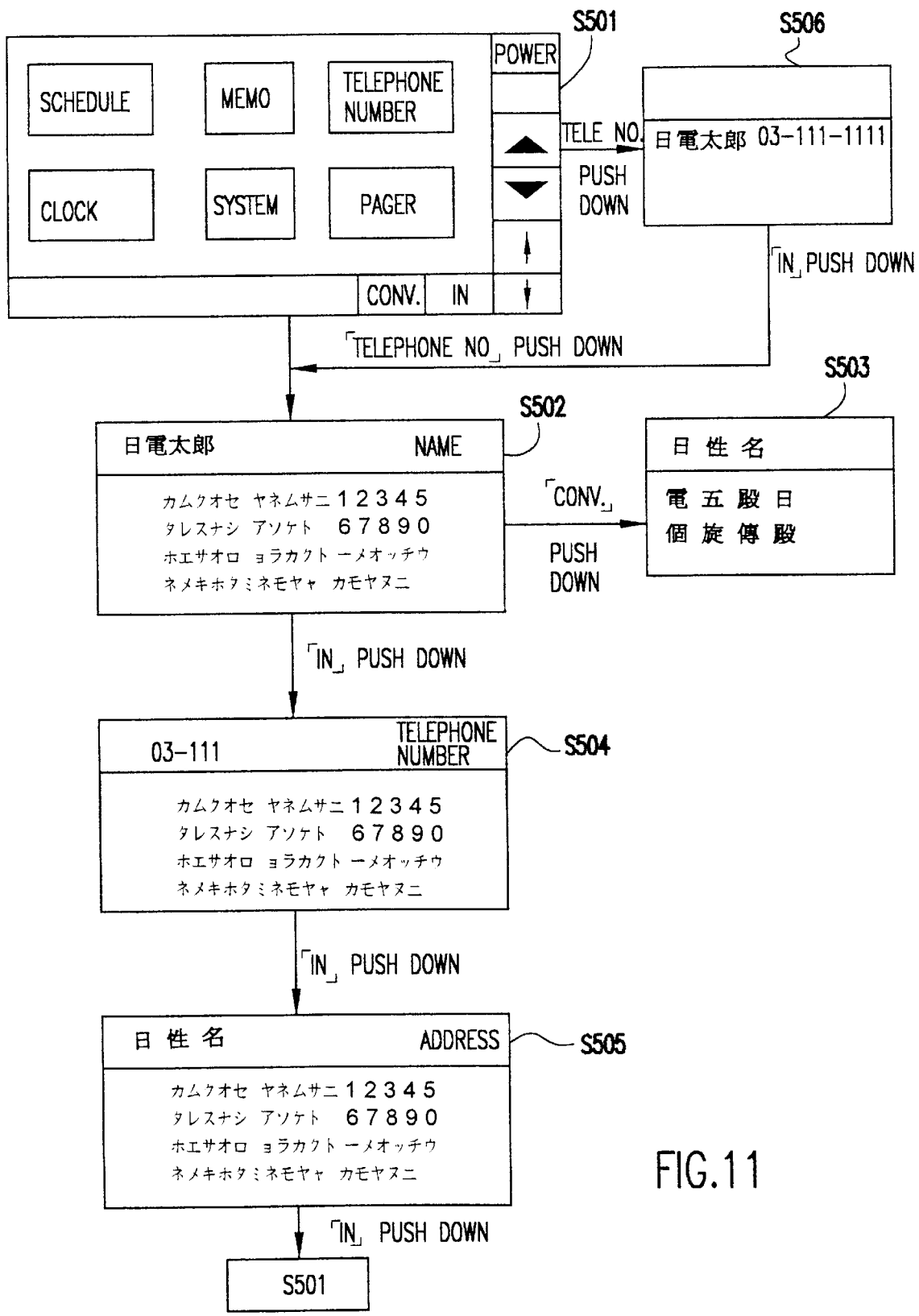
FIG. 11 is a flow chart of telephone directory entry of a password on the operation panel.

FIG. 6 is a view showing an example of a display of the operation panel, and FIG. 11 is a flow chart illustrating data inputting. Referring to FIG. 6, an inverted L-shaped area on a periphery of operation panel 8 has a fixed key area including power supply switch 16 and fixed key elements for individually executing different exclusive operations, and labels indicating contents of the operations are provided under the fixed key area. Accordingly, display contents of LCD unit 10 can be recognized in a region on the inner side of the fixed keys of operation panel 8.

First, if switch 16 part of the fixed key area is touched from above operation panel 8 using pen 20 while the power supply of the apparatus is in an off state, then a menu screen of the electronic notebook is displayed on LCD unit 10 (S501). Here, where no data is registered in the telephone directory function of the electronic notebook, if the "telephone directory" displaying part displayed on LCD unit 10 is touched from above operation panel 8 with pen 20, then the display of LCD unit 10 changes to a screen for inputting a name. When a character of a name is to be inputted, if a part of a character displayed on LCD unit 10 is touched from above operation panel 8 with pen 20, then a 'hiragana' is first displayed in a reversed state at an upper portion of the displaying part of LCD unit 10 (S502). When the character is to be inputted as the 'hiragana' as it is, this is inputted by touching the "input" part of the fixed key area from above operation panel 8 with pen 20. On the other hand, when the 'hiragana' is to be converted into a 'kanji', if the "conversion" part of the fixed key area is touched from above operation panel 8 with pen 20, then the display of LCD unit 10 changes to a table display screen of converted characters. Here, if a desired character displaying part is touched from above operation panel 8 with pen 20, then the converted character is inputted (S503).

After all characters of the name are inputted, if the "input" part of the fixed key area is touched from above operation panel 8 with pen 20, then the display of LCD unit 10 changes to an input screen for a telephone number. A telephone number is inputted by operations similar to those in S501 and S502 (S504). After the telephone number is inputted, if the "input" part of the fixed key area is touched from above operation panel 8 with pen 20, then the display of LCD unit 10 changes to an input screen for address data. An address is inputted by similar operations to those in S501 and S502 (S505).

After all address data are inputted, if the "input" part of the fixed key area is touched from above operation panel 8 with pen 20, the display of LCD unit 10 returns to the screen of the electronic notebook menu, thereby completing registration of all data.

On the other hand, if the "telephone directory" displaying part of LCD unit 10 is touched from above operation panel 8 with pen 20 in S501 while data are registered already in the telephone directory, then a table of the registered telephone directory data is displayed (S506). Thus, when it is desired to input data newly, if the "input" part of the fixed key area is touched from operation panel 8 with pen 20, then the display of LCD unit 10 changes to the input screen for a name of S502. Inputting of data is performed by repeating the operation procedure described above.

Figure 12:
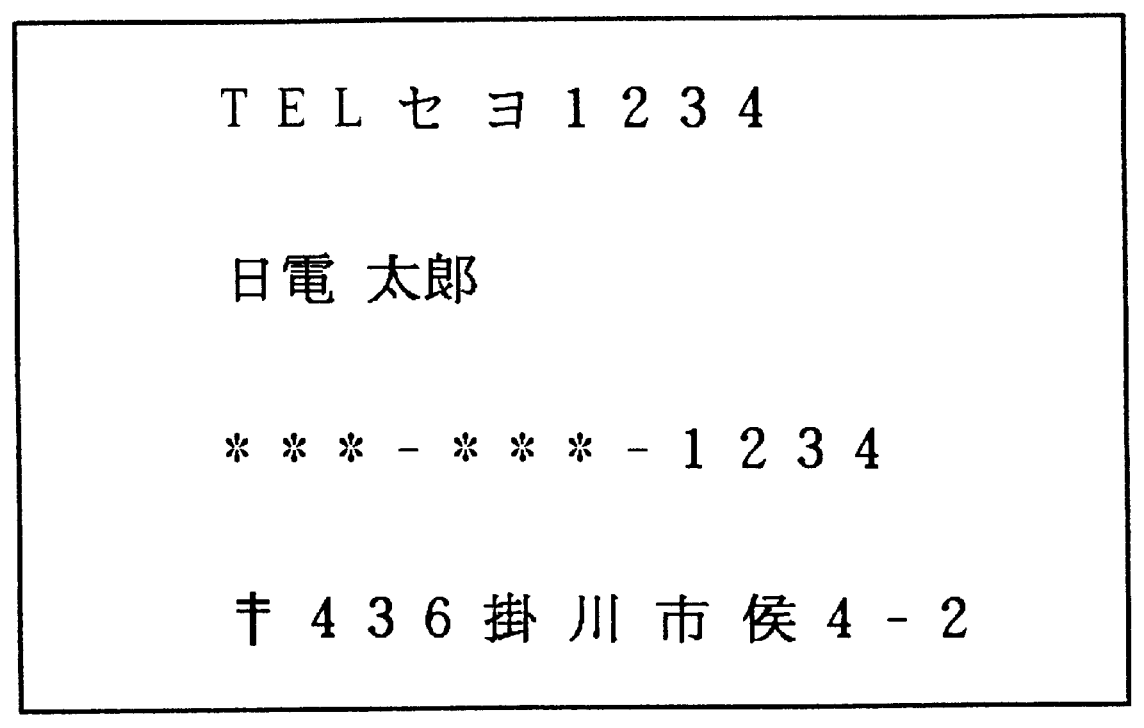

FIG. 12 is a view showing a display of a liquid crystal display unit and showing another embodiment.

In the present embodiment, to a person from whom the user wants to receive a message, the user sends in advance a notification to additionally send a telephone number of the person itself following a message, and if received message data include numeric data representative of a telephone number like, for example, "please call me 1234", then even if the radio paging receiver is in a stand by receiving state of paging by a password described above, controller 4 retrieves the lowest four digits of the numeric data (in this instance, 1234) from the telephone directory data stored in RAM 6 and displays, if it detects a coincident telephone number, auxiliary data in the telephone directory data such as a name together with the received message on LCD unit 10.

In the embodiments described above, the radio paging receiver has a telephone directory function by which data of the name, an address, a telephone number and so forth of an individual can be stored and uses the telephone number of the telephone directory data as a paging password. After the user carrying the receiver sets stand by receiving of paging by a password, if numeric data of four or more digits is present in a received message, then the lowest four digits of the numeric data are retrieved from telephone numbers of the telephone directory data and, only when a coincident telephone number exists, a paging action by speaker alert sound can be performed.

In this instance, since the telephone number in the telephone directory data is used as the password of the paging controller, a person who tries to send a message does not forget the password readily because the password of the radio paging receiver of the receiver carrying person is the telephone number of the person itself. Further, when a message having an incoincident password is received after stand by receiving of paging by a password is set, the receiver carrying person can select whether or not the received message should be left in the memory for the convenience of the receiver carrying person itself without operating a message unnecessary for the receiver carrying person.

Consequently, since a telephone number in the telephone directory data is used as a password for paging, a person who tries to send a message can remember a password of the radio paging receiver of the receiver carrying person well because the password is the telephone number of the person itself, and this is convenient for the user. Further, when a received message does not include numeric data representative of a telephone number or the telephone number of the received message is not registered in the telephone directory function after the user sets stand by receiving of paging by a password, the user can select paging wherein such reception is not notified at all and also the received message is not stored into the memory but is neglected completely.

As described above, in the present invention, only when a received message includes numeric data representative of a telephone number and the telephone number is registered in a telephone directory function after a user sets stand by receiving of paging by a password, a paging operation by speaker alert sound is performed. Consequently, while the paging function by a password is set, the user itself can select control of a paging operation so that, in regard to a message from a person unnecessary for the user, no paging operation by speaker alert sound may be performed.

Further, according to the present invention, since a telephone number in telephone directory data is used as a password for paging control, a person who tries to send a message can remember the password because the password of the radio paging receiver of the receiver carrying person is the telephone number of the person itself, and this is convenient for the user.

Furthermore, according to the present invention, after the user sets stand by receiving of paging by a password, when a received message does not include numeric data representative of a telephone number or the telephone number of the received message is not registered in a telephone directory function, the user can select paging wherein such reception is not notified at all and also the received message is not stored into the memory.

What is claimed is:

1. A paging apparatus by a password, comprising:
   receiving means for receiving a radio signal from a radio base station through an antenna;
   waveform shaping means for converting the received radio signal into a digital signal;
   controller means for controlling all components of said apparatus for radio paging, said controller means including at least
   discriminating means for comparing a data signal outputted from said waveform shaping means and a paging number,
   message analyzing means for analyzing a message from the data signal, and
   comparing means for comparing passwords of telephone numbers stored in advance therein and an originating person telephone number included in the data signal with each other;
   first memory means for storing the paging number in advance therein;
   second memory means for storing telephone directory data stored in advance and message data analyzed by said message analyzing means;
   third memory means for storing kanji conversion function data and other detailed function data in advance;
   operating panel means for setting an operation mode of paging control of radio paging and entering telephone directory data, a scheduler and a memorandum;
   liquid crystal display means for displaying data and a message, said liquid crystal display means including a driver for outputting a display signal;
   notifying means for being driven by a call signal outputted from said controller means when the password comparison reveals that the originating person telephone number coincide with any of the passwords; and
   power supply switch means for said apparatus for radio paging.

2. A paging apparatus by a password as claimed in claim 1, wherein said notifying means comprises
   speaker means for outputting a speaker alert signal for a call outputted from said controller means in the form of sound, said speaker means including a first amplifier for amplifying the speaker alert signal, and
   light emitting means for outputting an alert signal outputted from said controller means in the form of light, said light emitting means including a second amplifier for amplifying the alert signal.

3. A paging apparatus by a password as claimed in claim 1, wherein said switch means comprises
   a first power supply switch for enabling a calling operation of said apparatus for radio paging, and
   a second power supply switch for said operation panel means.

4. A paging apparatus by a password as claimed in claim 1, wherein said comparing means comprises
   retrieving means for retrieving, when the received message includes numeric data of four or more digits, the lowest four digits of the numeric data from among the telephone numbers of the telephone directory data stored as passwords in advance, and
   extracting means for comparing the data retrieved by said retrieving means with the data of the received message to detect whether there exists a coincident data and outputting, only when the coincident data exists, the coincident data.

5. A paging apparatus by a password as claimed in claim 1, wherein said controller means comprises
   inputting means for inputting data from an operation panel provided on said liquid crystal display means by touching with said operation panel in accordance with a displayed operation procedure in order to store data of a name, a telephone number, an address and forth of an individual into said second memory means,
   recalling means for recalling the inputted data in accordance with the necessity by an operation of said operation panel similar to that upon inputting, and managing means for the telephone directory data which can be displayed on said liquid crystal display unit.

6. A paging apparatus by a password as claimed in claim 1, wherein said controller means does not perform a calling operation by speaker alert sound when the analysis of said message analyzing means reveals that numeric data representing a telephone number is not added to the received message data or when the password comparison reveals that, although numeric data is added, the numeric data does not coincide with any of the telephone number data of the telephone directory function, but performs a calling operation by speaker alert sound when the password comparison reveals that the numeric data coincides with one of the telephone number data of the telephone directory function.

7. A paging apparatus by a password as claimed in claim 1, wherein said controller means does not perform, upon reception, a calling operation by lighting of a light emitting diode, display of the received message, storage of the received message so as to allow later confirmation of the received message and speaker alert sound when the analysis of said message analyzing means reveals that numeric data representing a telephone number is not added to the received message data or when the password comparison reveals that, although numeric data is added, the numeric data does not coincide with any of the telephone number data of the telephone directory function, but performs a calling operation by speaker alert sound when the password comparison reveals that the numeric data coincides with one of the telephone number data of the telephone directory function.

8. A paging apparatus by a password as claimed in claim 1, wherein selecting means for selecting an operation mode of the paging performs a calling operation by speaker alert sound when the password comparison reveals that the numeric data coincides with one of the telephone number data of the telephone directory function, but selects, when numeric data representing a telephone number is not added to the received message data or when the password comparison reveals that, although numeric data is added, the numeric data does not coincide with any of the telephone number data of the telephone directory function, one of a first paging mode in which a calling operation by speaker alert sound is not perform and a second paging mode in which a calling operation by lighting of a light emitting diode, display of the received message, storage of the received message so as to allow later confirmation of the received message and speaker alert sound is not performed upon reception.

9. A paging method by a password, comprising the steps of:

setting paging of radio paging by a password;

receiving a message of a paging number of a self apparatus;

confirming whether paging by a password is set;

performing, when the paging is not set, a normal receiving calling operation of notifying a user that a call has been received by displaying the received message;

comparing, when the paging is set, numeric data included in the received message data with telephone numbers of telephone directory data; and performing, if the comparison reveals that a coincident telephone number exists, a calling operation for normal reception; and performing, if the comparison reveals that no coincident telephone number exists, a calling operation only by lighting.

10. A paging method by a password, comprising the steps of:

confirming, when a message of a paging number of a self apparatus is received while the apparatus is in a stand by receiving state, whether paging by a password is set;

performing, when the confirmation reveals that the paging is not set, a calling operation for normal reception to notify to a user that a call has been received by displaying the received message;

retrieving, when the confirmation reveals that the paging is set, if analysis of the received message reveals that the message data include numeric data representative of a telephone number, the telephone number from stored telephone directory data;

performing, when the retrieval reveals that a coincident telephone number has been extracted, a calling operation for normal reception to notify the user that a call has been received by displaying the received message similarly as in the case wherein the paging is not set;

returning to the stand by receiving state after the calling operation comes to an end; and returning, when the retrieval reveals that no coincident telephone number has been extracted, if the received message does not include numeric data, to the stand by receiving state without performing a calling operation at all.

* * * * *